US012148351B2

(12) United States Patent
Chen

(10) Patent No.: US 12,148,351 B2
(45) Date of Patent: Nov. 19, 2024

(54) METHOD AND APPARATUS FOR DETERMINING COMPENSATION PARAMETER OF DISPLAY PANEL

(71) Applicant: KunShan Go-Visionox Opto-Electronics Co., Ltd, Jiangsu (CN)

(72) Inventor: Feng Chen, Kunshan (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 0 days.

(21) Appl. No.: 17/988,129

(22) Filed: Nov. 16, 2022

(65) Prior Publication Data

US 2023/0069956 A1 Mar. 9, 2023

Related U.S. Application Data

(63) Continuation of application No. PCT/CN2021/094992, filed on May 20, 2021.

(30) Foreign Application Priority Data

Jul. 24, 2020 (CN) ......................... 202010723136.0

(51) Int. Cl.
*G09G 3/20* (2006.01)

(52) U.S. Cl.
CPC ... *G09G 3/2092* (2013.01); *G09G 2320/0233* (2013.01); *G09G 2320/0673* (2013.01)

(58) Field of Classification Search
CPC ......... G09G 3/2092; G09G 2320/0233; G09G 2320/0673; G09G 5/10; G09G 2360/16; G09G 3/20
See application file for complete search history.

(56) References Cited

U.S. PATENT DOCUMENTS 10,121,408 B2 * 11/2018 Deng .................. G09G 3/2074
2012/0013635 A1 * 1/2012 Beeman .................. G09G 5/02
345/590

(Continued)

FOREIGN PATENT DOCUMENTS

CN 105529002 A 4/2016
CN 107610649 A 1/2018

(Continued)

OTHER PUBLICATIONS

The International search report for PCT Application No. PCT/CN2021/094992, dated Jul. 26, 2021, 18 pages.

(Continued)

*Primary Examiner* — Jose R Soto Lopez
(74) *Attorney, Agent, or Firm* — Maier & Maier, PLLC

(57) ABSTRACT

A display panel and a display apparatus. The display panel includes: a substrate; a light-emitting unit on the substrate; an encapsulation layer on a side of the light-emitting unit away from the substrate, where the encapsulation layer includes a first inorganic film layer, a first auxiliary film layer and an organic film layer that are stacked on the light-emitting unit, an absolute value of a difference between a refractive index of the first inorganic film layer and a refractive index of the first auxiliary film layer is less than or equal to 0.05, and an extinction coefficient of the first auxiliary film layer for visible light is less than an extinction coefficient of the first inorganic film layer for visible light.

14 Claims, 5 Drawing Sheets

(56) References Cited

U.S. PATENT DOCUMENTS

| | | | | |
|---|---|---|---|---|
| 2014/0168285 | A1* | 6/2014 | Takahashi | G09G 5/02 345/690 |
| 2014/0333654 | A1* | 11/2014 | Li | G06T 11/001 345/591 |
| 2016/0037157 | A1* | 2/2016 | Kim | H04N 13/398 348/54 |
| 2016/0057318 | A1* | 2/2016 | Hsieh | G09G 3/36 345/88 |
| 2016/0104429 | A1* | 4/2016 | Kang | G09G 3/3291 345/212 |
| 2017/0061902 | A1* | 3/2017 | Zhang | G09G 3/3426 |
| 2018/0102091 | A1* | 4/2018 | Deng | G09G 3/3233 |
| 2019/0066555 | A1* | 2/2019 | Gu | G09G 3/006 |
| 2019/0066574 | A1* | 2/2019 | Wang | G09G 3/20 |
| 2019/0130853 | A1* | 5/2019 | Zhu | G09G 3/3607 |
| 2019/0156760 | A1* | 5/2019 | Noh | G09G 3/3233 |
| 2019/0371251 | A1* | 12/2019 | Fan | G09G 3/20 |
| 2019/0384561 | A1* | 12/2019 | Jung | G06F 3/1446 |
| 2019/0385544 | A1* | 12/2019 | Tan | G09G 3/3607 |
| 2020/0126497 | A1* | 4/2020 | Wang | G09G 5/10 |
| 2020/0154003 | A1* | 5/2020 | Chen | G09G 3/3607 |
| 2020/0193937 | A1* | 6/2020 | Tsai | G09G 5/02 |
| 2020/0234634 | A1* | 7/2020 | Li | G09G 3/3208 |
| 2021/0013277 | A1* | 1/2021 | Liu | H10K 59/353 |
| 2021/0166612 | A1* | 6/2021 | Lee | G09G 3/2092 |
| 2021/0166654 | A1* | 6/2021 | Yu | G09G 3/2011 |
| 2021/0183296 | A1* | 6/2021 | Lee | G09G 3/2003 |
| 2021/0248950 | A1* | 8/2021 | Jin | G09G 3/2092 |
| 2021/0327958 | A1* | 10/2021 | Li | H01L 33/42 |
| 2022/0020306 | A1* | 1/2022 | Park | G09G 3/2096 |
| 2022/0108653 | A1* | 4/2022 | Kim | G09G 5/02 |
| 2022/0319382 | A1* | 10/2022 | Kim | G09G 5/005 |
| 2023/0189605 | A1* | 6/2023 | Ryoo | H10K 59/353 257/40 |
| 2023/0215392 | A1* | 7/2023 | Cao | G09G 3/3426 345/204 |
| 2023/0237948 | A1* | 7/2023 | He | G09G 3/2007 345/690 |

FOREIGN PATENT DOCUMENTS

| | | | |
|---|---|---|---|
| CN | 107731152 | A | 2/2018 |
| CN | 108510940 | A | 9/2018 |
| CN | 109979392 | A | 7/2019 |
| CN | 110189727 | A | 8/2019 |
| CN | 110277058 | A | 9/2019 |
| CN | 110349543 | A | 10/2019 |
| CN | 110447061 | A | 11/2019 |
| CN | 110675835 | A | 1/2020 |
| CN | 110706634 | A | 1/2020 |
| CN | 110767197 | A | 2/2020 |
| CN | 108510940 | B | 4/2020 |
| CN | 111161691 | A | 5/2020 |
| CN | 111243512 | A | 6/2020 |
| CN | 111816112 | A | 10/2020 |
| KR | 20190047918 | A | 5/2019 |

OTHER PUBLICATIONS

The First Office Action for Chinese Application No. 202010723136.0, dated Jan. 12, 2022, 11 pages.

The Grant Notification for Chinese Application No. 202010723136.0, dated Mar. 15, 2022, 6 pages.

* cited by examiner

METHOD AND APPARATUS FOR DETERMINING COMPENSATION PARAMETER OF DISPLAY PANEL

CROSS-REFERENCE TO RELATED APPLICATIONS

This application is a continuation of International Application No. PCT/CN2021/094992, filed on May 20, 2021, which claims priority to Chinese Patent Application No. 202010723136.0, filed on Jul. 24, 2020, both of which are hereby incorporated by reference in their entireties.

TECHNICAL FIELD

The present application relates to the field of display technology, and in particular, to a method for determining a compensation parameter of a display panel and an apparatus for determining a compensation parameter of a display panel.

BACKGROUND

Currently, common display apparatus, such as monitors, televisions, cell phones, tablets, and the like, have display screens that are generally regular rectangles. With the development of display technology, the rectangular display screens can no longer meet the diverse needs of users. Thus, the shapes of display screens are becoming more and more diverse.

In order to increase the screen-to-body ratio and realize a function such as picture-shooting from the front side of the display panel, special-shaped display panels have been developed. The special-shaped display panel includes a non-display area embedded in an edge or an inner portion of the display area, and the non-display area is at least partially surrounded by the special-shaped display area. As such, an optical device such as a front camera can be arranged at the non-display area to realize the function of picture-shooting from the front side of the display panel, and at the same time, since the non-display area is at least partially surrounded by the special-shaped display area, the screen-to-body ratio is improved.

However, due to the difference in the loads between the special-shaped display area and the conventional display areas, the problem that the display brightness of the special-shaped display area is dim is likely to occur.

SUMMARY

In a first aspect, embodiments of the present application provide a method for determining a compensation parameter of a display panel. The display panel includes a non-display area, a first display area, and a second display area, and the first display area at least partially surrounds the non-display area. The method includes: acquiring a first current brightness value of the first display area under a first gray level; determining a brightness compensation coefficient f corresponding to the first display area according to the first gray level and a preset corresponding relationship between gray-level ranges and brightness compensation coefficients, where $0<f\leq 1$; determining an actual brightness value of the first display area according to a product of the first current brightness value and the brightness compensation coefficient corresponding to the first display area; determining a first compensation parameter corresponding to the first display area according to the actual brightness value and a first target brightness value of the first display area.

In a second aspect, the embodiments of the present application provide an apparatus for determining a compensation parameter of a display panel. The display panel includes a non-display area, a first display area, and a second display area, and the first display area at least partially surrounds the non-display area. The apparatus includes: a current brightness acquiring module configured to acquire a first current brightness value of the first display area under a first gray level; a compensation coefficient determining module configured to determine a brightness compensation coefficient f corresponding to the first display area according to the first gray level and a corresponding relationship between gray-level ranges and brightness compensation coefficients, where $0<f\leq 1$; an actual brightness determining module configured to determine an actual brightness value of the first display area according to a product of the first current brightness value and the brightness compensation coefficient corresponding to the first display area; a compensation parameter determining module configured to determine a first compensation parameter corresponding to the first display area according to the actual brightness value and a first target brightness value of the first display area.

In the method and the apparatus for determining a compensation parameter of a display panel according to the embodiments of the present application, the first current brightness value of the first display area under the first gray level is acquired, the brightness compensation coefficient corresponding to the first display area is determined according to the first gray level and the preset corresponding relationship between gray-level ranges and brightness compensation coefficients, and then the actual brightness value of the first display area is determined according to the product of the first current brightness value and the brightness compensation coefficient corresponding to the first display area, and finally the first compensation parameter corresponding to the first display area is determined according to the actual brightness value and the first target brightness value of the first display area. According to the embodiments of the present application, the first current brightness value is multiplied by the brightness compensation coefficient less than or equal to 1, the actual brightness value of the first display area obtained is less than or equal to the first current brightness value, and then the first display area can compensated in a higher degree, thereby mitigating the problem that the first display area is dark and improving the display effect of the display panel.

BRIEF DESCRIPTION OF THE DRAWINGS

Features, objects and advantages of the present application will be apparent from the detailed description of non-limiting embodiments which follows, taken in conjunction with the accompanying drawings, in which like references indicate same or similar features and the figures have not necessarily been drawn to scale.

DETAILED DESCRIPTION

Features and exemplary embodiments of various aspects of the present application will be described in detail below. In order to make the objects, technical solutions and advantages of the present application clearer, the present application is further described in detail below with reference to the drawings and specific embodiments. It should be understood that, the specific embodiments described herein are only intended to explain the present application, but not to limit the present application. For those skilled in the art, the present application can be implemented without some of those specific details. The following description of the embodiments is only for providing a understanding of the present application by showing examples of the present application.

Figure 1:
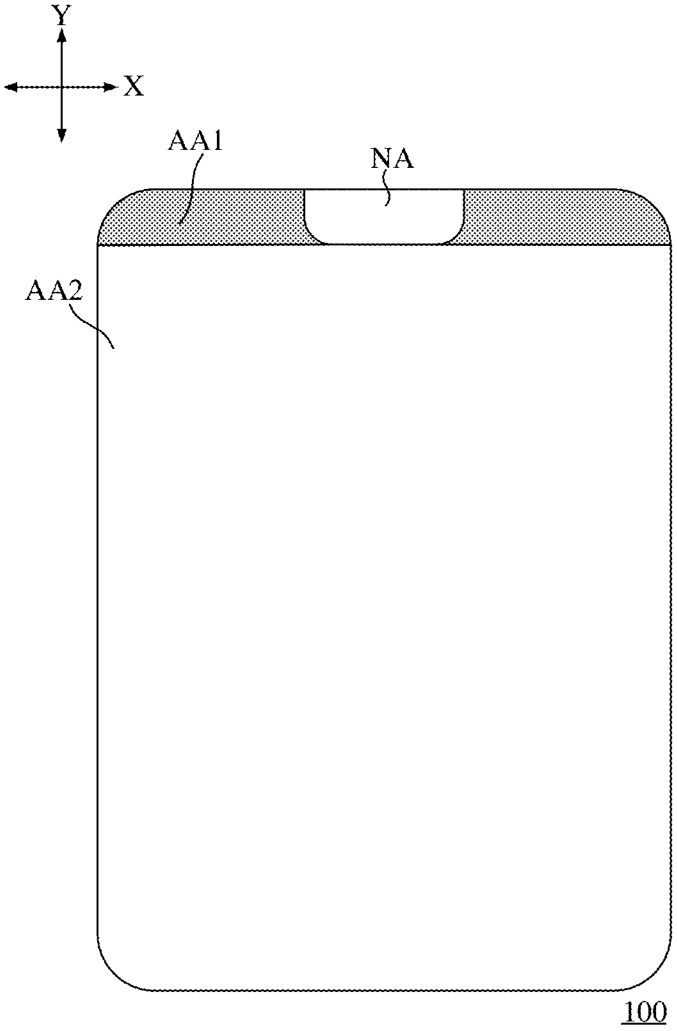
FIG. 1 illustrates a schematic structural diagram of a display panel according to an example.

FIG. 1 illustrates a schematic structural diagram of a display panel according to an example. As shown in FIG. 1, the display panel 100 may include a non-display area NA, a first display area AA1, and a second display area AA2. The first display area AA1 at least partially surrounds the non-display area NA.

In an example, the non-display area NA may be a hole area or a notch area. A through hole or a blind hole may be provided in the non-display area NA for placing a photosensitive component. The photosensitive component may be an image acquiring apparatus for acquiring external image information. For example, the photosensitive component is a camera or the like. The photosensitive component may not be limited to an image acquiring apparatus. For example, in some embodiments, the photosensitive component may be a light sensor (e.g., an infrared sensor, a proximity sensor, an infrared lens, a flood light sensing element, an ambient light sensor, and a dot matrix projector) or a device such as an earpiece and a speaker.

In addition, the shape of the non-display area NA is not limited in the present application, which can be adjusted according to the functional devices that it needs to accommodate. For example, the shape of the non-display area NA can be a circle, an ellipse, a dumbbell, a gourd, a rectangle, etc., or other irregular shapes.

As shown in FIG. 1, the non-display area NA is adjacent to an edge of the display panel 100 in a second direction Y, and the first display area AA1 may partially surround the non-display area NA. Alternatively, the non-display area NA is separated from the edge of the display panel by a certain distance, and the first display area AA1 may partially or fully surround the non-display area NA. The first display area AA1 can be understood as a special-shaped display area of the display panel, and the second display area AA2 can be understood as a regular display area of the display panel.

The display panel 100 further includes a scan driving circuit (GIP circuit, not shown in the figures) and a scan line (not shown in the figures) connected to the scan driving circuit. The scan driving circuit provides a scan signal to the pixels of the display panel through the scan line. The scan line generally extend along a first direction X that may be perpendicular to the second direction Y. Since the first display area AA1 surrounds the non-display area NA, the number of pixels connected by the scan line in the first display area AA1 is different from the number of pixels connected by the scan line in the second display area AA2. That is, a load of the scan line in the first display area AA1 is different from a load of the scan line in the second display area AA2. The applicant of the present application found that, due to the difference in the loads of the two display areas, the display brightness of the first display area AA1 is often darker than that of the second display area AA2.

The embodiments of the present application provide a method for determining a compensation parameter of a display panel and an apparatus for determining a compensation parameter of a display panel. Hereinafter, the embodiments of the method for determining the compensation parameter of the display panel and the apparatus for determining the compensation parameter of the display panel will be described with reference to the accompanying drawings.

The embodiments of the present application provide the method for determining the compensation parameter of the display panel, which is used for display panels that may be organic light emitting diodes (OLED) display panel or liquid crystal display panels.

Figure 2:
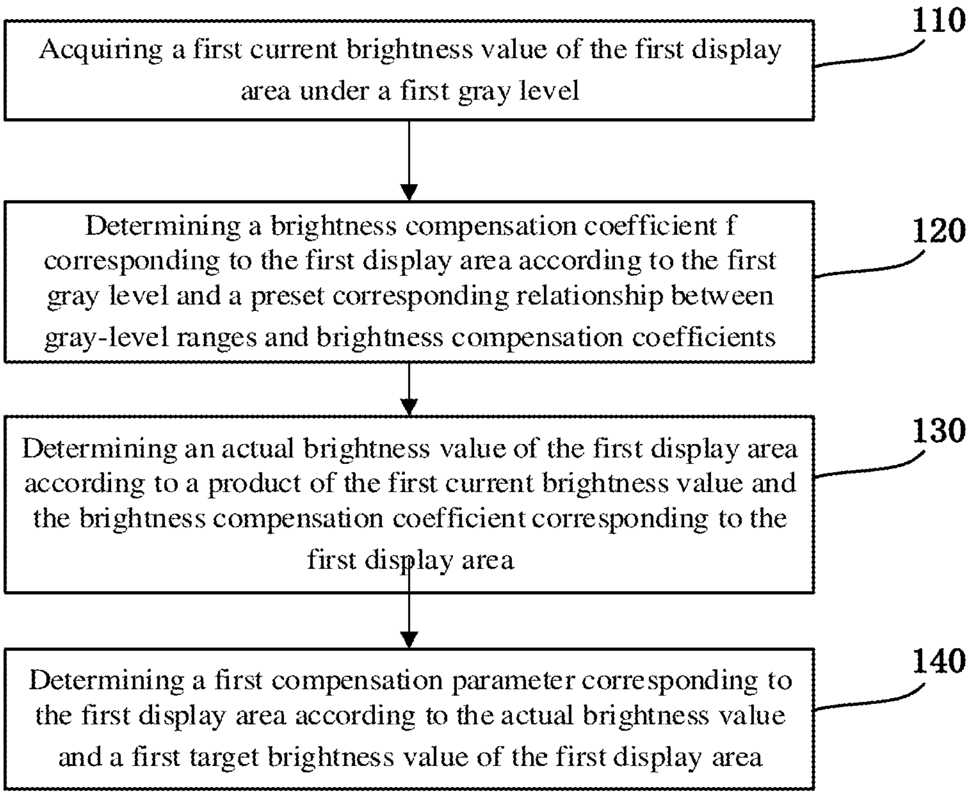
FIG. 2 illustrates a schematic flowchart of a method for determining a compensation parameter of a display panel according to an embodiment of the present application.

FIG. 2 illustrates a schematic flowchart of a method for determining a compensation parameter of a display panel according to an embodiment of the present application. As shown in FIG. 2, the method for determining the compensation parameter of the display panel according to the embodiments of the present application may include the following steps:

step 110, acquiring a first current brightness value of the first display area under a first gray level;

step 120, determining a brightness compensation coefficient f corresponding to the first display area according to the first gray level and a corresponding relationship between gray-level ranges and brightness compensation coefficients, where $0<f\leq 1$;

step 130, determining an actual brightness value of the first display area according to a product of the first current brightness value and the brightness compensation coefficient corresponding to the first display area;

step 140, determining a first compensation parameter corresponding to the first display area according to the actual brightness value and a first target brightness value of the first display area.

In the compensation method of a display panel according to the embodiments of the present application, the first current brightness value of the first display area under the first gray level is acquired, the brightness compensation coefficient corresponding to the first display area is determined according to the first gray level and the preset corresponding relationship between gray-level ranges and brightness compensation coefficients, and then the actual brightness value of the first display area is determined according to the product of the first current brightness value and the brightness compensation coefficient corresponding to the first display area, and finally the first compensation parameter corresponding to the first display area is determined according to the actual brightness value and the first target brightness value of the first display area. According to the embodiments of the present application, the first current brightness value is multiplied by the brightness compensation coefficient less than or equal to 1, the actual brightness value of the first display area obtained is less than or equal to the first current brightness value, and then the first display area can compensated in a higher degree, thereby mitigating the problem that the first display area is dark and improving the display effect of the display panel.

In an example, in step 110, the first gray level may be any gray level that the display panel can display. For example, the gray-level range that the display panel can display is 0 to 255, and the first gray level may be a gray level of 60, a gray level of 120, a gray level of 224, and the like.

The first display area and the second display area of the display panel may include a plurality of pixel units arranged in an array. In step 110, the first current brightness values may be a brightness value of the pixel units in the first display area under the first gray level. In an example, the pixel units may include sub-pixels of at least three colors, for example, the pixel units include red sub-pixels, green sub-pixels, and blue sub-pixels. In step 110, the first current brightness value may be a brightness value of the sub-pixels of each color in the first display area under the first gray level. In an example, the first compensation parameter corresponding to the sub-pixels of each color in the first display area under the first gray level may be sequentially determined.

In an example, taking the first gray level as the gray level of 120 as an example, the first compensation parameter corresponding to the red sub-pixels in the first display area under the gray level of 120 may be determined first. For example, the data voltage corresponding to the gray level of 120 may be inputted to the red sub-pixels of the display panel, and image data of the red sub-pixels in the first display area of the display panel under the gray level of 120 may be acquired by an image acquiring device to acquire the first current brightness value of the red sub-pixels in the first display area under the gray level of 120. The image acquiring device may be a color analyzer, such as CA410, CA310, etc. To avoid interference from ambient light, the image acquisition may be performed in a dark room. The image acquiring device may be placed directly above the display panel, and it is ensured that the image acquiring device is focused, so as to accurately acquiring the image data of the display panel. The first current brightness values of sub-pixels of other colors under the first gray level can be acquired similarly, and the details will not be repeated in this application.

Before step 120, a plurality of different gray-level ranges and a brightness compensation coefficient corresponding to each of the plurality of gray-level ranges may be preset (that is, the corresponding relationship between gray-level ranges and brightness compensation coefficients may be preset), where a brightness compensation coefficient corresponding to a first gray-level range of any adjacent two gray-level ranges is less than a brightness compensation coefficient corresponding to a second gray-level range of the adjacent two gray-level ranges, and a minimum gray-level value in the first gray-level range is greater than a maximum gray-level value in the second gray-level range. That is, as the gray level value increases, its corresponding brightness compensation coefficient decreases gradually.

Figure 3:
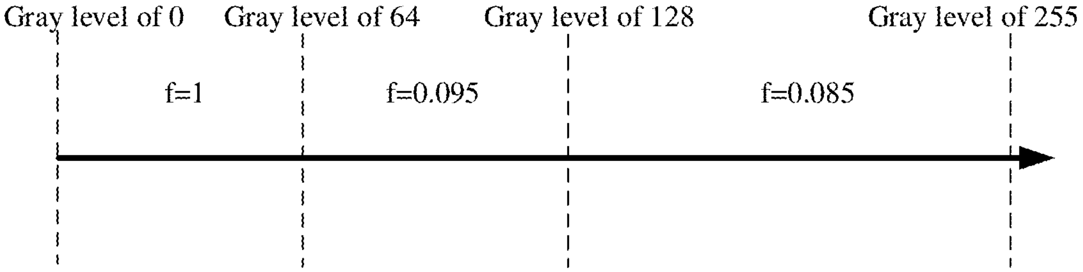
FIG. 3 illustrates a schematic diagram of a corresponding relationship between gray-level ranges and brightness compensation parameters according to an embodiment of the present application.

FIG. 3 illustrates a schematic diagram of a corresponding relationship between gray-level range and brightness compensation parameters according to an embodiment of the present application. In an example, as shown in FIG. 3, three gray-level ranges may be preset, which are a gray-level range [0, 64], a gray-level range (64, 128], and a gray-level range (128, 255]. A brightness compensation coefficient f corresponding to the gray-level range [0, 64] is equal to 1, a brightness compensation coefficient f corresponding to the gray-level range (64, 128] is equal to 0.095, and the brightness compensation coefficient f corresponding to the gray-level range (128, 255] is equal to 0.085. The gray-level ranges and the brightness compensation coefficients corresponding to the gray-level ranges shown in FIG. 3 are merely an example, and more gray-level ranges (such as 10 ranges, 20 ranges) may be preset and the brightness compensation coefficients corresponding to the gray-level ranges may be set.

The applicant of the present application has found that, the display brightness of the first display area is darker when the display panel displays an image of a med-to-high gray level than when the display panel displays an image of a low gray level. Therefore, in the present application, in the set gray-level ranges, as the gray level value increases, the corresponding brightness compensation coefficient gradually decreases. In step 130, the product of the first current brightness value and the brightness compensation coefficient corresponding to the first display area may be used as the actual brightness value of the first display area. It should be understood that, under the first gray level, the real display brightness of the first display area is the first current brightness value. In this application, the first current brightness value is processed, and the actual brightness value of the first display area is represented by the product of the first current brightness value and the brightness compensation coefficient corresponding to the first display area. Further, in step 140, the first compensation parameter of the first display area is determined based on the actual brightness value obtained after the processing.

In an example, if the first gray level belongs to the med-to-high gray level range (for example, the first gray level belongs to the gray level range (64, 128], or the first gray level belongs to the gray level range (128, 255]), the obtained actual brightness value of the first display area is smaller, that is, the represented actual brightness value of the first display area is lower, so that the first display area can be compensated for a high degree, to improve the problem of the serious degree of darkness when the first display area displays the image of the high gray level. If the first gray level belongs to the low gray-level range (for example, the first gray level belongs to the gray-level range [0, 64]), the represented actual brightness value of the first display area is the same as the real brightness value of the first display area. The high degree compensation for the first display area is avoided, so that excessive compensation is avoided when the first display area displays the image of the low gray level, thereby avoiding that the display brightness of the first display area is higher than that of the second display area when the first display area displays the image of the low gray level, and improving the display consistency of the display panel.

In an example, in step 130, Matlab may be used to extract the first current brightness value obtained by the image acquiring apparatus. If what is obtained in step 110 is the first current brightness values corresponding to the pixel units arranged in a array in the first display area, then in step 130, the first current brightness values corresponding to the pixel units arranged in the array is each multiplied by the brightness compensation coefficient corresponding to the first display area.

In some optional embodiments, in step 140, the first compensation parameter may be a first compensation gray-level value. Step 140 may specifically include: determining, according to the gamma curve of the display panel, the first gray-level value corresponding to the actual brightness value and the second gray-level value corresponding to the first target brightness value; calculating the difference between the second gray-level value and the first gray-level value, to obtain the first compensation parameter corresponding to the first display area.

Figure 4:
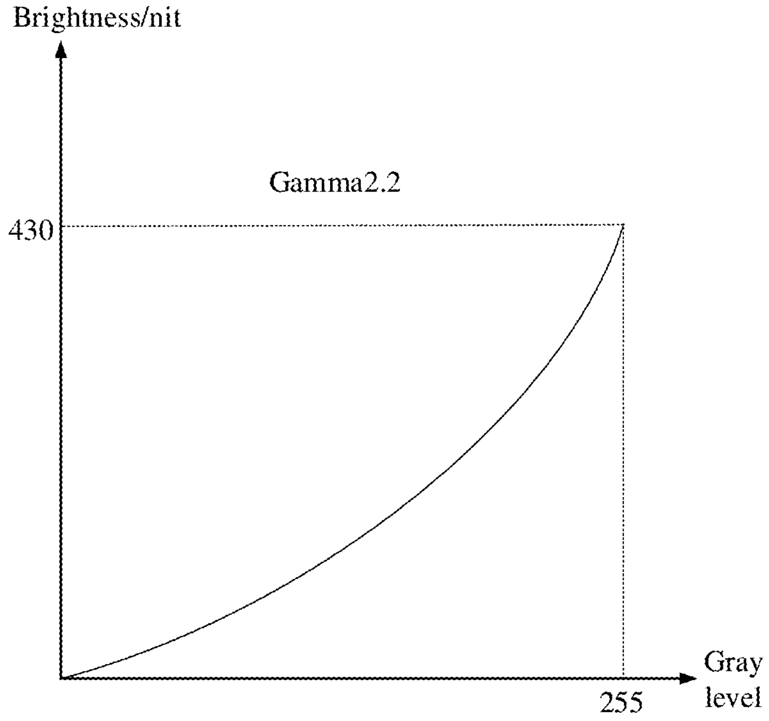
FIG. 4 illustrates a schematic diagram of a gamma curve of a display panel according to an embodiment of the present application.
Figure 5:
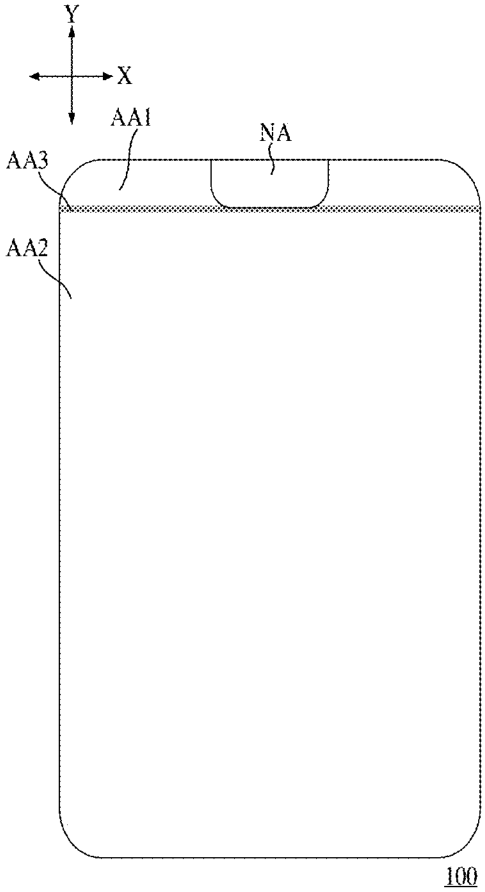
FIG. 5 illustrates a schematic structural diagram of a display panel according to another example.

FIG. 4 illustrates a schematic diagram of a gamma curve of a display panel according to an embodiment of the present application. As shown in FIG. 4, the gamma curve of the display panel represents the corresponding relationship between gray-level values and brightness values of the display panel. The gamma curve includes the brightness value corresponding to any gray-level value. In an example, the gamma value (Gamma) of the display panel is 2.2, and the brightness value corresponding to the gray level of 255 in the gamma curve is 430 nits. It should be noted that, the gamma value of the display panel is not limited in the present application. In the step of determining the first gray-level value corresponding to the actual brightness value and the second gray-level value corresponding to the first target brightness value according to the gamma curve of the display panel, the brightness data may be converted into corresponding gray-level value data, and the difference between the second gray-level value and the first gray-level value is calculated, which is the compensation gray-level value corresponding to the first display area. Therefore, the first compensation parameter corresponding to the first display area is accurately determined, so as to perform more effective compensation for the first display area.

In addition, in step 140, the first target brightness value may be the brightness value at the center point of the second display area under the first gray level. Alternatively, the first target brightness value may be an average brightness value of the second display area at the first gray level. It should be understood that, if the first gray-level image is a monochrome picture (for example, the first gray-level image is a red picture), the average brightness value of the second display area under the first gray level is the average brightness value of the red sub-pixels in the second display area under the first gray level.

The first target brightness value of the first display area is set as a brightness value at the central point of the second display area or an average brightness value of the second display area, so that when the brightness of the first display area is compensated using the first compensation parameter, not only the brightness of the first display area is prevented from being dark, but also the display brightness of the first display area tends to be consistent with the display brightness of the second display area, thereby improving the consistency of the display brightness of the display panel.

In some optional embodiments, the method for determining the compensation parameter of the display panel according to the embodiments of the present application may further include: step 151, acquiring the second current brightness value of the second display area under the first gray level; and step 152, determining a second compensation parameter corresponding to the second display area according to the second current brightness value and the second target brightness value of the second display area.

In an example, the second current brightness value may be the brightness value the pixel units in the second display area under the first gray level. In an example, the pixel units may include sub-pixels of at least three colors, for example, the pixel units include a red sub-pixel, a green sub-pixel, and a blue sub-pixel. In step 151, the second current brightness value may be a brightness value of the sub-pixels of each color in the second display area under the first gray level. In an example, the second compensation parameter corresponding to the sub-pixels of each color in the second display area under the first gray level may be sequentially determined.

In an example, the second compensation parameter may be the second compensation gray-level value. Step 152 may specifically include: determining, according to the gamma curve of the display panel, a third gray-level value corresponding to the second current brightness value and a fourth gray-level value corresponding to the second target brightness value; calculating a difference between the fourth gray-level value and the third gray-level value, to obtain the second compensation parameter corresponding to the second display area.

According to the embodiments of the present application, the second current brightness value of the second display area is not further processed. Instead, the second compensation parameter corresponding to the second display area is directly determined according to the second current brightness value and the second target brightness value parameter, to avoid the excessive compensation for the second display area.

In addition, in step 152, the second target brightness value may be the brightness value at the center point of the second display area under the first gray level. Alternatively, the second target brightness value may be the average brightness value of the second display area under the first gray level, so as to ensure that the brightness of each area in the second display area after compensation is consistent.

In some optional embodiments, the display panel 100 further includes a transition display area AA3 located between the first display area AA1 and the second display area AA2. In an example, the number of pixel rows actually occupied by the non-display area NA is 88, while the number of pixel rows occupied by the non-display area NA stored by the IC chip of the display panel is 90. During actual display, the IC chip will always provide black image data to the pixels of the 89th-90th rows along the column direction of the non-display area NA, and due to a crosstalk problem, there will be a clear boundary between the first display area AA1 and the second display area AA2, that is, the display brightness of the transition display area AA3 is obviously inconsistent with the brightness of the first display area AA1 and the second display area AA2. The applicant of the present application has found that, when the display panel displays an image of a high gray level, there is usually a bright boundary between the first display area AA1 and the second display area AA2, and when the display panel displays an image of a low gray level, there is usually a dark boundary between the first display area AA1 and the second display area AA2. In addition, the applicant of the present application further found that, if gray level compensation is performed on the pixel units in the transition display area AA3, the problem of excessive compensation will occur, for example, the bright boundary line will be darker and the darker boundary line will be brighter after the compensation. The gray level compensation generally only compensates integer gray-level values, and cannot meet the more refined compensation requirements of the transition display area.

In view of this, the method for determining the compensation parameter of the display panel according to the embodiments of the present application may further include: step 161, acquiring a third current brightness value of the transition display area under the first gray level; step 162, selecting a part of pixel units in the transition display area as target pixel units, so that any adjacent two of the target pixel units are separated by non-selected pixel units; step 163, determining a third compensation parameter corresponding to the target pixel units in the transition display area according to the third current brightness value and a third target brightness value of the transition display area, and setting a compensation parameter of the non-selected pixel units in the transition display area as 0.

In an example, the third current brightness value may be the brightness value of the pixel units in the transition display area under the first gray level. In an example, the pixel units may include sub-pixels of at least three colors, for example, the pixel units include red sub-pixels, green sub-pixels, and blue sub-pixels. In step 161, the third current brightness value may be a brightness value of the sub-pixels of each color in the transition display area under the first gray level. In an example, the third compensation parameter corresponding to the sub-pixels of each color in the target pixel unit in the transition display area under the first gray level may be sequentially determined.

In an example, the third compensation parameter may be a third compensation gray-level value. Step 163 may specifically include: determining, according to the gamma curve of the display panel, a fifth gray-level value corresponding to the third current brightness value and a sixth gray-level value corresponding to the third target brightness value; calculating a difference between the sixth gray-level value and the fifth gray-level value, to obtain the third compensation parameter corresponding to the transition display area.

According to the embodiments of the present application, only the third compensation parameter corresponding to some target pixel units in the transition display area is determined, and the compensation parameter of the non-selected pixel units is set to 0, so that only some pixel units in the transition display area may be compensated. Therefore, the compensation effect of a few tenths of gray level can be achieved on the average for all the pixel units in the transition display area, so as to a finer compensation for the transition display area and to avoid causing the excessive compensation for the transition display area. In addition, a non-selected pixel unit is spaced between adjacent target pixel units, so that uniform compensation can be performed on the transition display area.

In addition, in step 163, the third target brightness value may be the brightness value at the center point of the second display area under the first gray level. Alternatively, the third target brightness value may be an average brightness value of the second display area under the first gray level. Setting the third target brightness value of the transition display region as the brightness value at the center point of the second display region or the average brightness value of the second display region can make the display brightness of the transition display region tend to be consistent with the display brightness of the second display region and improve the consistency of the display brightness of the display panel.

In some optional embodiments, step 162 may specifically include: selecting the part of pixel units in the transition display area as the target pixel units, so that any adjacent two of the target pixel units along a row direction are separated by N non-selected pixel units, and any adjacent two of the target pixel units along a column direction are separated by N non-selected pixel units; where N is a positive integer greater than or equal to 1.

Figure 6:
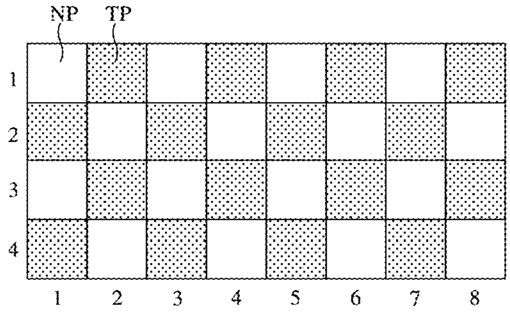
FIG. 6 illustrates a schematic diagram of selection of target pixel units according to an embodiment of the present application.
Figure 7:
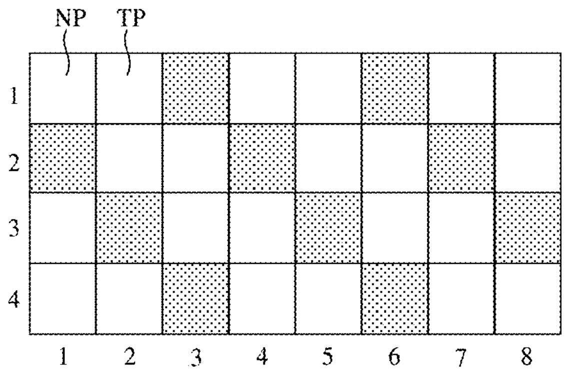
FIG. 7 illustrates a schematic diagram of selection of target pixel units according to another embodiment of the present application.

In an example, as shown in FIG. 6 and FIG. 7, pixel units with 4 rows and 8 columns in the transition display area are shown. FIG. 6 and FIG. 7 are only examples, and do not mean that the pixel units in the transition display area are 4 rows and 8 columns as shown in FIG. 6 or FIG. 7. In FIG. 6 and FIG. 7, the unfilled shape represents the non-selected pixel units NP, and the filled shape represents the selected target pixel units TP.

With reference to FIG. 6, the target pixel units TP can be selected in every other row and every other column. In FIG. 6, the pixel units in the even-numbered columns and in the odd-numbered rows are selected as the target pixel units TP, and the pixel units in the odd-numbered columns and in the even-numbered rows are selected as the target pixel units TP, and the rest are regarded as the non-selected pixel units NP. That is, in the same row of pixel units, adjacent target pixel units TP are separated by one non-selected pixel unit NP, and in the same column of pixel units, adjacent target pixel units TP are separated by one non-selected pixel unit NP.

As shown in FIG. 6, if the third compensation parameter corresponding to each target pixel unit TP is one gray level, the compensation effect of 0.5 gray level can be achieved for all pixel units in the transition display area.

The target pixel units TP can be selected in every other multiple rows and every other multiple columns With reference to FIG. 7, the target pixel units TP can be selected in every other two rows and every other two columns. That is, in the same row of pixel units, adjacent target pixel units TP are separated by two non-selected pixel units NP, and in the same column of pixel units, adjacent target pixel units TP are separated by two non-selected pixel units NP.

As shown in FIG. 7, if the third compensation parameter corresponding to each target pixel unit TP is one gray level, the compensation effect of about 0.33 gray level can be achieved for all pixel units in the transition display area.

According to the embodiments of the present application, the number of non-selected pixel units spaced between any two adjacent target pixel units in the row direction is equal to the number of non-selected pixel units spaced between any two adjacent target pixel units in the column direction. In this way, more uniform compensation for the transition display area can be realized.

In some optional embodiments, the method for determining the compensation parameter according to the embodiments of the present application may further include step 170: storing, into a storage module of the display panel, the first compensation parameter corresponding to the first display area, the second compensation parameter corresponding to the second display area, and the third compensation parameter corresponding to the target pixel units in the transition display area.

In this way, when compensating the display panel, each compensation parameter can be directly called, and there is no need to re-calculate each compensation parameter, so that the display delay of the display panel can be avoided and user satisfaction can be improved.

Figure 8:
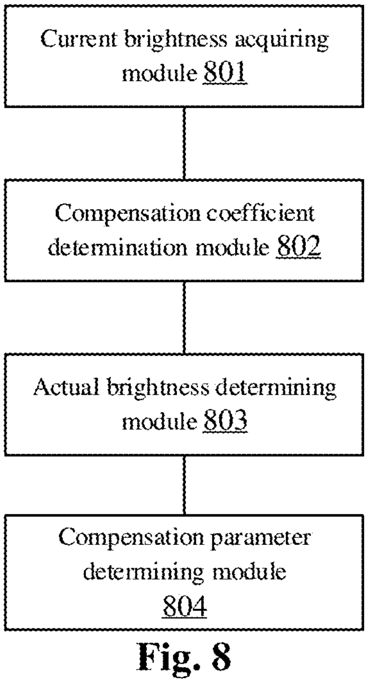
FIG. 8 is a schematic structural diagram of an apparatus for determining a compensation parameter of a display panel according to an embodiment of the present application.

FIG. 8 illustrates a schematic structural diagram of an apparatus for determining a compensation parameter of a display panel according to an embodiment of the present application. The display panel includes a non-display area, a first display area and a second display area, the first display area at least partially surrounding the non-display area. As shown in FIG. 8, the apparatus for determining a compensation parameter of a display panel according to the embodiments of the present application may include the following modules:

a current brightness acquiring module 801 configured to acquire a first current brightness value of the first display area under a first gray level;

a compensation coefficient determination module 802, which may also be referred to as a compensation coefficient determining circuit, is configured to determine a brightness compensation coefficient f corresponding to the first display area according to the first gray level and a preset corresponding relationship between gray-level ranges and brightness compensation coefficients, where $0<f\leq 1$;

an actual brightness determining module 803 configured to determine an actual brightness value of the first display area according to a product of the first current brightness value and the brightness compensation coefficient corresponding to the first display area;

a compensation parameter determining module 804 configured to determine a first compensation parameter corresponding to the first display area according to the actual brightness value and a first target brightness value of the first display area.

In the apparatus for determining a compensation parameter of a display panel according to the embodiments of the present application, the first current brightness value of the first display area under the first gray level is acquired, the brightness compensation coefficient corresponding to the first display area is determined according to the first gray level and the preset corresponding relationship between gray-level ranges and brightness compensation coefficients, and then the actual brightness value of the first display area is determined according to the product of the first current brightness value and the brightness compensation coefficient corresponding to the first display area, and finally the first compensation parameter corresponding to the first display area is determined according to the actual brightness value and the first target brightness value of the first display area. According to the embodiments of the present application, the first current brightness value is multiplied by the brightness compensation coefficient less than or equal to 1, the actual brightness value of the first display area obtained is less than or equal to the first current brightness value, and then the first display area can compensated in a higher degree, thereby mitigating the problem that the first display area is dark and improving the display effect of the display panel.

In some optional embodiments, the apparatus for determining the compensation parameter of the display panel according to the embodiments of the present application may further include a corresponding relationship setting module, configured to:

set a plurality of different gray-level ranges and a brightness compensation coefficient corresponding to each of the plurality of gray-level ranges, where a brightness compensation coefficient corresponding to a first gray-level range of any adjacent two of the plurality of gray-level ranges is less than a brightness compensation coefficient corresponding to a second gray-level range of the adjacent two gray-level ranges, and a minimum gray-level value in the first gray-level range is greater than a maximum gray-level value in the second gray-level range.

In some optional embodiments, the compensation parameter determining module 804 is specifically configured to: determine, according to a gamma curve of the display panel, a first gray-level value corresponding to the actual brightness value and a second gray-level value corresponding to the first target brightness value; calculate a difference between the second gray-level value and the first gray-level value, to obtain the first compensation parameter corresponding to the first display area.

In some optional embodiments, the current brightness acquiring module 801 is further configured to acquire a second current brightness value of the second display area under the first gray level; The compensation parameter determining module 804 is further configured to determine a second compensation parameter corresponding to the second display area according to the second current brightness value and a second target brightness value of the second display area.

In some optional embodiments, the display panel further includes a transition display area between the first display area and the second display area, and the current brightness acquiring module 801 is further configured to: acquire a third current brightness value of the transition display area under the first gray level; the apparatus further includes a selecting module configured to select a part of pixel units in the transition display area as target pixel units, so that any adjacent two of the target pixel units are separated by non-selected pixel units; the compensation parameter determining module 804 is further configured to determine a third compensation parameter corresponding to the target pixel units in the transition display area according to the third current brightness value and a third target brightness value of the transition display area, and set a compensation parameter of the non-selected pixel units in the transition display area as 0.

In some optional embodiments, the selecting module is specifically configured to:

select the part of pixel units in the transition display area as the target pixel units, so that any adjacent two of the target pixel units along a row direction are separated by N non-selected pixel units, and any adjacent two of the target pixel units along a column direction are separated by N non-selected pixel units; where N is a positive integer greater than or equal to 1.

In some optional embodiments, the first current brightness value is a brightness value of pixel units in the first display area under the first gray level, the second current brightness value is a brightness value of pixel units in the second display area under the first gray level, and the third current brightness value is a brightness value of pixel units in the transition display area under the first gray level; each of the first target brightness value, the second target brightness value and the third target brightness value is a brightness value of the center point of the second display area under the first gray level, or, each of the first target brightness value, the second target brightness value and the third target brightness value is an average brightness value of the second display area under the first gray level.

In some optional embodiments, the apparatus may further include a storage controlling module configured to:

store, into a storage module of the display panel, the first compensation parameter corresponding to the first display area, the second compensation parameter corresponding to the second display area, and the third compensation parameter corresponding to the target pixel units in the transition display area.

The embodiments of the present application further provide a computer-readable storage having medium computer program instructions stored thereon, where the computer program instructions, when executed by the processor, implements the methods for determining the compensation parameter of the display panel according to any one of the foregoing embodiments. The program or code segment may be stored in a machine-readable medium, or transmitted on a transmission medium or a communication link through a data signal carried in a carrier wave. "Machine-readable medium" may include any medium that can store or transmit information. Examples of machine-readable media include electronic circuits, semiconductor memory devices, ROM, flash memory, erasable ROM (EROM), floppy disks, CD-ROMs, optical disks, hard disks, fiber optic media, radio frequency (RF) links, and so on. The code segment can be downloaded via a computer network such as the Internet, an intranet, etc. According to the embodiments of the present application, the computer readable storage medium may be a non-transitory computer readable storage medium.

The embodiments of the present application as described above do not exhaust all the details and do not limit the scope of the present application. Obviously, many modifications and variations can be made by those of ordinary skill in the art in light of the above description. These embodiments are described in detail to best explain the principles of the invention and its practical application and to thereby enable others skilled in the art to best utilize the invention and various embodiments with various modifications as are suited to the particular use contemplated. The scope of the application is limited only by the appended claims.

What is claimed is:

1. A method for determining a compensation parameter of a display panel, the display panel comprising a non-display area, a first display area, a second display area, and a transition display area between the first display area and the second display area, wherein the first display area at least partially surrounds the non-display area, and the method comprising:

acquiring a first current brightness value of the first display area under a first gray level;

determining a brightness compensation coefficient f corresponding to the first display area according to the first gray level and a preset corresponding relationship between gray-level ranges and brightness compensation coefficients, wherein $0<f\leq 1$;

determining an actual brightness value of the first display area according to a product of the first current brightness value and the brightness compensation coefficient f corresponding to the first display area;

determining a first compensation parameter corresponding to the first display area according to the actual brightness value and a first target brightness value of the first display area, wherein the first target brightness value is a brightness value at a center point of the second display area under the first gray level or an average brightness value of the second display area under the first gray level;

determining, according to a gamma curve of the display panel, a first gray-level value corresponding to the actual brightness value and a second gray-level value corresponding to the first target brightness value;

calculating a difference between the second gray-level value and the first gray-level value, to obtain the first compensation parameter corresponding to the first display area;

acquiring a third current brightness value of the transition display area under the first gray level;

selecting a part of pixel units in the transition display area as target pixel units, so that any adjacent two of the target pixel units are separated by non-selected pixel units;

determining a third compensation parameter corresponding to the target pixel units in the transition display area according to the third current brightness value and a third target brightness value of the transition display area; and setting a compensation parameter of the non-selected pixel units in the transition display area as 0.

2. The method according to claim 1, wherein before determining the brightness compensation coefficient f corresponding to the first display area according to the first gray level and the preset corresponding relationship between the gray-level ranges and the brightness compensation coefficients, the method further comprises:

setting a plurality of different gray-level ranges and a brightness compensation coefficient corresponding to each of the plurality of gray-level ranges, wherein a brightness compensation coefficient corresponding to a first gray-level range of any adjacent two of the plurality of gray-level ranges is less than a brightness compensation coefficient corresponding to a second gray-level range of the adjacent two gray-level ranges, and a minimum gray-level value in the first gray-level range is greater than a maximum gray-level value in the second gray-level range.

3. The method according to claim 1, further comprising:

acquiring a second current brightness value of the second display area under the first gray level; and determining a second compensation parameter corresponding to the second display area according to the second current brightness value and a second target brightness value of the second display area.

4. The method according to claim 3, wherein the second target brightness value is a brightness value at a center point of the second display area under the first gray level, or, the second target brightness value is an average brightness value of the second display area under the first gray level.

5. The method according to claim 1, wherein determining the third compensation parameter corresponding to each of the target pixel units in the transition display area according to the third current brightness value and the third target brightness value of the transition display area, and setting the compensation parameter of the non-selected pixel units in the transition display area as 0 further comprises:

determining, according to the gamma curve of the display panel, a fifth gray-level value corresponding to the third current brightness value and a sixth gray-level value corresponding to the third target brightness value; and calculating a difference between the sixth gray-level value and the fifth gray-level value, to obtain the third compensation parameter corresponding to the transition display area.

6. The method according to claim 1, wherein selecting the part of the pixel units in the transition display area as the target pixel units, so that any adjacent two of the target pixel units are separated by the non-selected pixel units further comprises:

selecting the part of pixel units in the transition display area as the target pixel units, so that any adjacent two of the target pixel units along a row direction are separated by N non-selected pixel units, and any adjacent two of the target pixel units along a column direction are separated by N non-selected pixel units; wherein N is a positive integer greater than or equal to 1.

7. The method according to claim 1, wherein the first current brightness value is a brightness value of pixel units in the first display area under the first gray level, the second current brightness value is a brightness value of pixel units in the second display area under the first gray level, and the third current brightness value is a brightness value of pixel units in the transition display area under the first gray level.

8. The method according to claim 6, wherein each of the first target brightness value, the second target brightness value, and the third target brightness value is a brightness value of the center point of the second display area under the first gray level.

9. The method according to claim 6, wherein each of the first target brightness value, the second target brightness value, and the third target brightness value is an average brightness value of the second display area under the first gray level.

10. The method according to claim 6, wherein the first current brightness value is a brightness value of pixel units in the first display area under the first gray level, the second current brightness value is a brightness value of pixel units in the second display area under the first gray level, and the third current brightness value is a brightness value of pixel units in the transition display area under the first gray level; each of the first target brightness value, the second target brightness value, and the third target brightness value is a brightness value of the center point of the second display area under the first gray level, or, each of the first target brightness value, the second target brightness value, and the third target brightness value is an average brightness value of the second display area under the first gray level.

11. The method according to claim 1, further comprising:

storing, the first compensation parameter corresponding to the first display area, the second compensation parameter corresponding to the second display area, and the third compensation parameter corresponding to the target pixel units in the transition display area, into a storage module of the display panel.

12. An apparatus for determining a compensation parameter of a display panel, the display panel comprising a non-display area, a first display area, a second display area, and a transition display area between the first display area and the second display area, wherein the first display area at least partially surrounds the non-display area, and the apparatus comprising:

a current brightness acquiring module configured to acquire a first current brightness value of the first display area under a first gray level and acquire a third current brightness value of the transition display area under the first gray level;

a compensation coefficient determining module configured to determine a brightness compensation coefficient f corresponding to the first display area according to the first gray level and a corresponding relationship between gray-level ranges and brightness compensation coefficients, wherein 0<f≤1;

an actual brightness determining module configured to determine an actual brightness value of the first display area according to a product of the first current brightness value and the brightness compensation coefficient f corresponding to the first display area;

a compensation parameter determining module configured to determine a first compensation parameter corresponding to the first display area according to the actual brightness value and a first target brightness value of the first display area and determine a third compensation parameter corresponding to the target pixel units in the transition display area according to the third current brightness value and a third target brightness value of the transition display area and set a compensation parameter of the non-selected pixel units in the transition display area as 0; and a selecting module configured to select a part of pixel units in the transition display area as target pixel units, so that any adjacent two of the target pixel units are separated by non-selected pixel units.

13. The apparatus according to claim 12, further comprising:

a corresponding relationship setting module configured to:

set a plurality of different gray-level ranges and a brightness compensation coefficient corresponding to each of the plurality of gray-level ranges, wherein a brightness compensation coefficient corresponding to a first gray-level range of any adjacent two of the plurality of gray-level ranges is less than a brightness compensation coefficient corresponding to a second gray-level range of the adjacent two gray-level ranges, and a minimum gray-level value in the first gray-level range is greater than a maximum gray-level value in the second gray-level range.

14. A non-transitory computer-readable storage medium having computer program instructions stored thereon, wherein the computer program instructions, when executed by a processor, implement a method for determining a compensation parameter of a display panel, the display panel comprising a non-display area, a first display area, a second display area, and a transition display area between the first display area and the second display area, wherein the first display area at least partially surrounds the non-display area, and the method comprising:

acquiring a first current brightness value of the first display area under a first gray level;

determining a brightness compensation coefficient f corresponding to the first display area according to the first gray level and a preset corresponding relationship between gray-level ranges and brightness compensation coefficients, wherein 0<f≤1;

determining an actual brightness value of the first display area according to a product of the first current brightness value and the brightness compensation coefficient f corresponding to the first display area;

determining a first compensation parameter corresponding to the first display area according to the actual brightness value and a first target brightness value of the first display area, wherein the first target brightness value is a brightness value at a center point of the second display area under the first gray level or an average brightness value of the second display area under the first gray level;

determining, according to a gamma curve of the display panel, a first gray-level value corresponding to the actual brightness value and a second gray-level value corresponding to the first target brightness value;

calculating a difference between the second gray-level value and the first gray-level value, to obtain the first compensation parameter corresponding to the first display area;

acquiring a third current brightness value of the transition display area under the first gray level;

selecting a part of pixel units in the transition display area as target pixel units, so that any adjacent two of the target pixel units are separated by non-selected pixel units;

determining a third compensation parameter corresponding to the target pixel units in the transition display area according to the third current brightness value and a third target brightness value of the transition display area; and setting a compensation parameter of the non-selected pixel units in the transition display area as 0.

* * * * *